United States Patent
Dvori et al.

(10) Patent No.: US 11,797,404 B2
(45) Date of Patent: Oct. 24, 2023

(54) TECHNIQUES FOR PEER NODE RECOVERY

(71) Applicant: Dell Products L.P., Hopkinton, MA (US)

(72) Inventors: Yossi Dvori, Holon (IL); Pavel Shlakhter, Kfar Saba (IL); Liran Loya, Hod Hasharon (IL)

(73) Assignee: Dell Products L.P., Hopkinton, MA (US)

( * ) Notice: Subject to any disclaimer, the term of this patent is extended or adjusted under 35 U.S.C. 154(b) by 18 days.

(21) Appl. No.: 17/495,079

(22) Filed: Oct. 6, 2021

(65) Prior Publication Data
US 2023/0112336 A1   Apr. 13, 2023

(51) Int. Cl.
*G06F 11/00* (2006.01)
*G06F 11/20* (2006.01)
*G06F 9/4401* (2018.01)

(52) U.S. Cl.
CPC .......... *G06F 11/2094* (2013.01); *G06F 9/4406* (2013.01); *G06F 9/4416* (2013.01); *G06F 2201/82* (2013.01)

(58) Field of Classification Search
CPC ... G06F 9/4406; G06F 9/4416; G06F 11/1417; G06F 11/2094
See application file for complete search history.

(56) References Cited

U.S. PATENT DOCUMENTS

| | | | | |
|---|---|---|---|---|
| 7,080,134 B2* | 7/2006 | Doherty et al. | ...... | G06F 9/4416 713/1 |
| 8,146,076 B1* | 3/2012 | Shumway et al. | ....... | G06F 8/63 717/169 |
| 10,372,462 B2* | 8/2019 | Reunamaki et al. | ... | G06F 21/32 |
| 10,740,021 B1* | 8/2020 | Patil et al. | ........... | G06F 9/4416 |
| 2007/0214348 A1* | 9/2007 | Danielsen | ........... | G06F 9/4416 713/2 |
| 2017/0075698 A1* | 3/2017 | Zamir | ................. | G06F 9/4416 |

OTHER PUBLICATIONS

ZENworks 2020 Update 1 Preboot Services and Imaging Reference, Jun. 2020.*
PXE Booting and Kickstart Technology, "G PXE Booting and Kickstart Technology," Oracle® Enterprise Manager Administrator's Guide for Software and Server Provisioning and Patching 10g Release 5 (10.2.0.5.0), Part Number E14500-04, 2011, https://docs.oracle.com/cd/B16240_01/doc/em.102/e14500/appdx)pxebo.*

* cited by examiner

*Primary Examiner* — Michael Maskulinski
(74) *Attorney, Agent, or Firm* — Muirhead and Saturnelli, LLC

(57) ABSTRACT

Techniques for peer node recovery can include: receiving a notification regarding an occurrence of a trigger condition which indicates to perform recovery processing for a first storage device of a first node, wherein the first storage device is used as a boot device for the first node; and responsive to receiving the notification of the trigger condition, performing recovery processing for the first storage device of the first node comprising: performing a network boot of the first node over an internal network connection using a preboot execution (PXE) server of the second node; reimaging the first storage device of the first node using content from a second storage device of the second node, wherein the content includes a bootable partition comprising an operating system; and using the bootable partition of the first storage device of the first node, booting the first node to load and run the operating system.

23 Claims, 5 Drawing Sheets

400

402 — A trigger condition occurs indicating to perform recovery processing for a first node, such as node B. The trigger condition can denote an error condition or can be an on-demand request to perform recovery processing for the first storage device of the first node. The first storage device of the node B can be the internal PD 326 of node B used as a boot device to boot the node B. The trigger condition can be, for example, an error condition related to the boot device, the internal PD 326 of the node B. The error condition, or other trigger condition as described elsewhere herein, can be automatically detected by the system manager component. In response to detecting the error condition, or more generally an occurrence of a defined trigger condition, the system management component and initiate and control performing recovery processing for the internal PD 326 of the node B. The recover processing can perform processing to re-image or restore the internal PD 326 of node B used for booting the node B.

404 — The system manager component starts the PXE server on the peer node, node A in this example. The PXE server can include a network configuration server such as a DHCP server, a file server such as a TFTP server, and a network protocol server, such as an HTTP server.

406 — The system manager communicates with the BMC of the first node, node B in this example, and instructs the BMC 332 to boot the node B from the network. The network can be the internal LAN including the internode network connection 120 between the two nodes 301a-b of the internal LAN. The BMC 332 of node B can indirectly trigger execution of the firmware of the NIC 316b of node B, where the NIC firmware includes client-side code for performing a network boot over the internode network connection 120. For example, the BMC 332 of node B can communicate with the BIOS of node B and instruct the BIOS of node B to perform a network boot over the internode network connection 120 using the NIC firmware of the NIC 316b.

408 — The client code (of the NIC firmware of the node B) boots and broadcasts a first request or packet over the internal LAN indicating that node B needs a network configuration from the DHCP server of the PXE server of the peer node A.

410 — The DHCP server of node A responds to the first request by sending a first response to the node B. The first response can include a network configuration as specified by the DHCP protocol. The network configuration can include the new IP address for the client node A, and can also identify the network location of the network boot file or package to be downloaded and executed by the client code of the node B. The network location of the network boot file or package can be the IP address of the TFTP server of the PXE server on the peer node A.

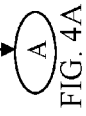

TECHNIQUES FOR PEER NODE RECOVERY

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, which are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems typically do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein include a computer-implemented method, a system and a non-transitory computer readable medium. The system includes one or more processors, and a memory comprising code that, when executed, performs the method. The non-transitory computer readable medium includes code stored thereon that, when executed, performs the method. The method comprises: receiving a notification regarding an occurrence of a trigger condition which indicates to perform recovery processing for a first storage device of a first node, wherein the first storage device is a non-volatile storage device of the first node and is used as a boot device for the first node, wherein the data storage system includes the first node and a second node which is configured to communicate with the first node over an internal network connection within the data storage system; and responsive to receiving the notification of the trigger condition, performing recovery processing for the first storage device of the first node, said recovery processing including: performing a network boot of the first node over the internal network connection using a preboot execution (PXE) server of the second node; reimaging the first storage device of the first node using first content included on a second storage device of the second node, wherein the first content includes a bootable partition comprising an operating system; and using the bootable partition of the first storage device of the first node, booting the first node to load and run the operating system.

In at least one embodiment, the internal network connection can be an internode network connection between the first node and the second node. An internal local area network (LAN) within the data storage system can include the first node and the second node, wherein the first node can have a first IP (internet protocol) address on the internal LAN and the second node can have a second IP address on the internal LAN, and wherein the first node can use the first IP address and the second node can use the second IP address to communicate with one another over the internal network connection when performing the recovery processing techniques of the present disclosure.

In at least one embodiment, the PXE server of the second node can include a network configuration server, and a file server. The recovery processing can include: sending a first request from the first node over the internal LAN, wherein said sending broadcasts the first request over the internal LAN and indicates that the first node needs a network configuration; receiving, by a network configuration server of the second node, the first request; assigning, by the network configuration server of the second node, the first IP address to the first node; and sending, to the first node, a first response to the first request from the network configuration server of the second node, wherein the first response includes information identifying the first IP address as assigned to the first node and identifying the second IP address as the network address of the file server on the internal LAN.

In at least one embodiment, the recovery processing can include: sending a second request from the first node to the file server having the second IP address of the second node, wherein the second request requests a network boot file or package including a temporary kernel or operating system, a temporary file system, a script, and a boot configuration data file of parameters used in connection with booting the temporary kernel or operating system; and in response to receiving the second request, sending the network boot file or package from the file server of the second node to the first node.

In at least one embodiment, the recovery processing can include: storing the network boot file or package in a volatile memory of the first node; booting the first node using the temporary kernel or operating system of the network boot file or package stored in the volatile memory of the first node, wherein after said booting the temporary file system is executing on the first node; executing the script on the first node to perform said reimaging the first storage device of the first node, wherein the script performs processing including downloading the first content from the second storage device of the second node to the first storage device of the first node, wherein the first content includes the bootable partition comprising the operating system, one or more applications or services to run on the operating system, and storage configuration data including customizations performed to any of: the operating system, and the one or more applications or services; and performing said booting of the first node, using the bootable partition of the first storage device of the first node, to load and run the operating system and the one or more applications or services on the first node with any customizations applied as denoted by the storage configuration data.

In at least one embodiment, the second node can include a network protocol server. Downloading the first content can include issuing one or more requests from the first node to the network protocol server of the second node. The network protocol server can be included in the PXE server of the second node.

In at least one embodiment, the first node can include first board management component (BMC), the second node can include a second BMC, and the data storage system can include a system manager component that communicates with the first BMC and the second BMC to manage components of the first node and the second node. The system manager can receive the notification regarding the occurrence of the trigger condition, and wherein the system manager can communicate with the first BMC of the first node to initiate performing the recovery processing for the first storage device of the first node.

In at least one embodiment, the PXE server can be included in an execution domain, and wherein the system manager can start execution of the execution domain including the PXE server on-demand in response to receiving the notification regarding the occurrence of the trigger condition.

In at least one embodiment, the trigger condition canbe one of a plurality of defined trigger conditions comprising: determining that the first node is unable to boot using the first storage device; and replacing an existing device of the first node with a new device which is the first storage device. The plurality of defined trigger conditions can further include one or more of: when the first storage device of first node becomes corrupted, fails or otherwise cannot be accessed; when the first storage device requires re-imaging; when the first node fails; when the first node is unresponsive to either internal requests from the second node or external requests from external clients; when the first node has no external network connectivity; when the first BMC is active and responsive but a processor of the first node is not responsive to queries from the first BMC; and when the first node is replaced.

In at least one embodiment, the first storage device can be an internal non-volatile storage device of the first node, the second storage device can be an internal non-volatile storage device of the second node, and the first node can include a NIC (network interface card) with firmware which includes client software which performs processing including: said sending the first request from the first node over the internal LAN; receiving the first response to the first request from the network configuration server of the second node; said sending the second request from the first node to the file server of the second node; and receiving the network boot file or package from the file server of the second node. The processing performed by the client software of the NIC of the first node can also include: said storing the network boot file or package in the volatile memory of the first node; and said booting the first node using the temporary kernel or operating system of the network boot file or package stored in the volatile memory of the first node. The trigger condition can also be an on-demand request to perform the recovery processing.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 4A-4B are flowcharts of processing steps that can be performed in an embodiment in accordance with the techniques of the present disclosure.

DETAILED DESCRIPTION OF EMBODIMENT(S)

Figure 1:
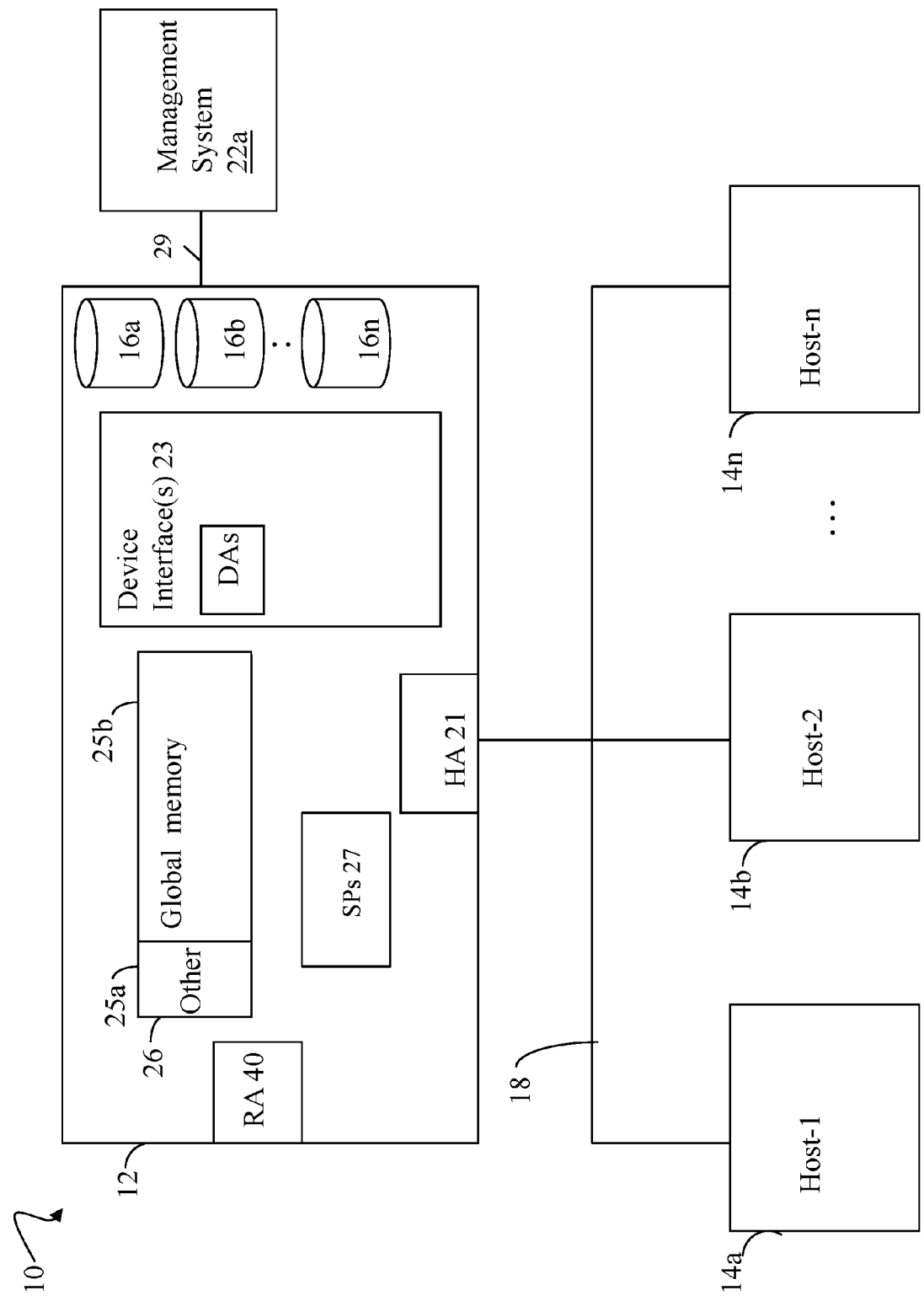
FIGS. 1 and 3 are examples of components included in a system in accordance with the techniques of the present disclosure.

In a data storage system or appliance, an internal disk drive can include an operating system, a boot partition and other code and/or data used by the system. In particular, the boot partition of the internal disk drive can be used to boot the data storage system. Sometimes, data and/or code stored on the internal disk drive can become corrupted. For example, the boot partition of the internal disk drive can become corrupted whereby the data storage system can no longer boot from its internal disk drive. In this case, it is necessary to perform recovery processing such as to replace the internal disk drive or otherwise to restore the internal disk drive to an operable state. The recovery processing ensures that the restored or replaced internal disk drive includes uncorrupted, usable forms of the boot partition and possibly other data and/or code, such as the operating system.

Some data storage systems include multiple processing nodes. For example, at least one existing data storage system can be a dual node configuration. Each of the two nodes can generally include one or more internal disk drives used exclusively by the node. An internal disk drive of a node can include the boot partition, the operating system, and other code and data used by the node. In such an embodiment of a dual node data storage system, each node of the system can boot independently of the other node of the system using the boot partition, operating system, and the like, stored on the node's internal disk drive. The boot partition and possibly other code and/or data stored on the internal disk drive of the node can become corrupted as noted above where, as a result, the node is unable to boot from its own internal disk drive.

At least one existing recovery technique that can be performed with respect to the corrupted internal disk drive of a node includes using an external drive or other external media (e.g., that is external with respect to the node and data storage system including the node) to boot the system and re-image the corrupted internal disk drive with uncorrupted content such as the boot partition and operating system.

As another existing recovery technique, the corrupted internal disk drive of the node can be a first internal disk drive of the node. The node can also include a second internal disk drive which includes another copy of the boot partition, operating system, and the like. In this latter case, the second internal disk drive of the node can be used as an alternate or secondary boot device to boot the node and also reimage or restore the first internal disk drive of the node, where the first internal disk drive can be used as the node's primary or main drive.

As yet another existing recovery technique, the corrupted internal disk drive of the node can be completely replaced with a new internal disk drive. In some cases, the new internal disk drive can include preconfigured and pre-installed software and data such as, for example, the boot partition, operating system, and the like. As a variation where the new internal disk drive is not pre-installed and preconfigured with the necessary software and/or data, the necessary software (e.g., boot partition, operating system, etc.) and data can be reimaged or installed on the new internal disk drive subsequent to replacing the corrupted internal disk drive of the node with the new internal disk. In this case, the necessary software and/or data can be installed on the new internal disk drive of the node as discussed above using other external media or another internal drive of the failed or unhealthy node. In this recovery technique, the new internal disk drive is pre-installed or preconfigured with the required software and data, or otherwise has the required software and data installed from an external drive or device. Use of an external drive or device, such as a flash-drive or other removable form of external non-volatile storage media, can be a security threat which introduces vulnerabilities to the system. For example, such external media used for reimaging a boot device of a node can be infected with viruses or other malware and therefore introduces another point of vulnerability of a security risk.

Accordingly, described in the present disclosure are techniques that can be used to perform recovery processing for the node having the corrupted internal disk drive used as the boot device for the node. In at least one embodiment, the data storage system or appliance can include multiple processing nodes, such as two nodes, where one of the nodes has a corrupted or otherwise failed internal disk drive and where the failed internal disk drive is the node's main drive used to boot the node. Thus the failed internal disk drive can be used as the node's main disk drive and includes, for example, the boot partition, the operating system, and the like.

In at least one embodiment, the techniques of the present disclosure provide for restoring the content of the corrupted internal disk drive of an unhealthy or failed first node of a dual node data storage system using a healthy second peer node of the dual node data storage system. In at least one other embodiment, the techniques of the present disclosure provide for installing the boot partition, operating system, applications, and other content on a newly installed internal disk drive of the first node of a dual node data storage system using the second peer node of the dual node data storage system. In this latter embodiment, the newly installed internal disk drive can replace the corrupted, degraded or otherwise non-bootable existing internal disk drive of the first node. Using the techniques of the present disclosure, the newly installed internal disk drive is not required to be preconfigured or preinstalled with the boot partition, the operating system and other content. Rather, in accordance with the techniques of the present disclosure, the boot partition, operating system, and other content can be installed on the new internal disk drive of the first node using the second peer node.

In such embodiments in accordance with the techniques of the present disclosure, the degraded first node with the unbootable internal disk drive can be booted using the healthy and functional second peer node. In particular in at least one embodiment, the second peer node can include a PXE (preboot execution environment) server that is used to perform a network boot of the first node over an internal network connection between the first and second nodes of the system. Additionally, the boot partition, operating system, and other content currently stored on the healthy second node can be used to reimage and restore the new or corrupted internal disk drive of the first node. Also any necessary system state information, configuration data or information, and/or other content can be restored from the second node to the new or corrupted internal disk drive of the first node. The internal network connection between the first and second nodes can be used for communications between the nodes and to transfer information between the nodes when performing the techniques of the present disclosure. The internal network connection can be internal with respect to the data storage system or appliance including the nodes. In at least one embodiment, the internal network connection can be an internode network connection used only for internode communications and internode data transmissions such as when performing the techniques of the present disclosure.

In accordance with the techniques of the present disclosure, the PXE server on a healthy node can be used to boot another peer node which does not have a bootable partition and operating system. Rather in at least one embodiment, the peer node can be booted over an internal network using firmware included in a NIC or network interface card of the peer node and using a network boot file or package downloaded from the healthy node.

The techniques of the present disclosure provide advantages over other existing techniques. For example, the techniques of the present disclosure provide a secure solution by booting the failed or unhealthy first node from the second peer node. Additionally in at least one embodiment, the techniques of the present disclosure can include reimaging or restoring the content of the corrupted or new internal disk drive of the first node without using external media and without using an external network or other external connection (e.g., where the external network or external connection connects the data storage system or appliance with the first and second nodes to other systems and components which are external to the system or appliance including the first and second nodes). The techniques of the present disclosure do not require any pre-installed or preconfigured software on the new internal disk drive which can be used to replace the existing corrupted or otherwise unbootable internal disk drive of the first node.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the "n" hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
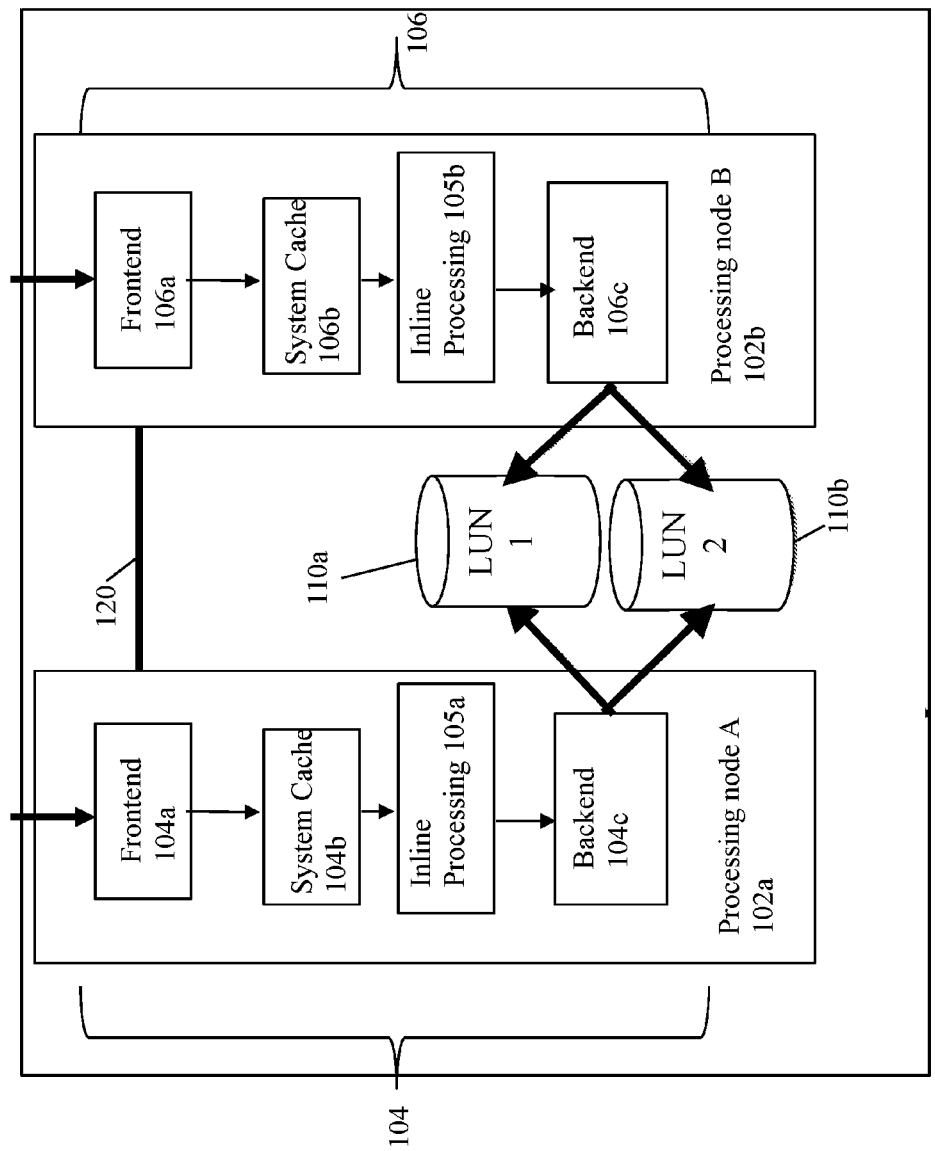
FIG. 2 is an example illustrating the I/O path or data path in connection with processing data in an embodiment in accordance with the techniques of the present disclosure.

With reference to the FIG. 2, shown is an example 100 illustrating components included in the data path in at least one existing data storage system in accordance with the techniques herein. The example 100 includes two processing nodes A 102a and B 102b and the associated software stacks 104, 106 of the data path, where I/O requests are received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing is performed by layer 105a. Such inline processing operations of 105a is optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing includes, for example, performing one or more data reduction operations such as data deduplication or data compression. The inline processing includes performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is directed to a location or logical address of a LUN and where data is read from, or written to, the logical address. The LUNs 110a, 110b are examples of storage objects representing logical storage entities included in an existing data storage system configuration. Since, in this example, writes, or more generally I/Os, directed to the LUNs 110a, 110b are received for processing by either of the nodes 102a and 102b, the example 100 illustrates what is also be referred to as an active-active configuration.

In connection with a write operation received from a host and processed by the processing node A 102a, the write data is written to the system cache 104b, marked as write pending (WP) denoting it needs to be written to the physical storage 110a, 110b and, at a later point in time, the write data is destaged or flushed from the system cache to the physical storage 110a, 110b by the BE component 104c. The write request is considered complete once the write data has been stored in the system cache whereby an acknowledgement regarding the completion is returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be optionally performed. For example, the inline processing can include performing data compression processing, data deduplication processing, and the like, that convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 is used for internode communication between the nodes 102a, 102b.

In connection with at least one embodiment in accordance with the techniques herein, each processor or CPU includes its own private dedicated CPU cache (also sometimes referred to as processor cache) that is not shared with other processors. In at least one embodiment, the CPU cache, as in general with cache memory, is a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache in at least one embodiment is substantially faster than the system RAM used as main memory, where the processor cache contains information that the processor will be immediately and repeatedly accessing. The faster memory of the CPU cache, for example, runs at a refresh rate that's closer to the CPU's clock speed, which minimizes wasted cycles. In at least one embodiment, there are two or more levels (e.g., L1, L2 and L3) of cache. The CPU or processor cache includes at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor is the closest of all cache levels (e.g., L1-L3) to the processor which stores copies of the data from frequently used main memory locations. Thus, the system cache as described herein includes the CPU cache (e.g., the L1 level cache or dedicated private CPU/processor cache) as well as other cache levels (e.g., the LLC) as described herein. Portions of the LLC are used, for example, to initially cache write data which is then flushed to the backend physical storage such as BE PDs providing non-volatile storage. For example, in at least one embodiment, a RAM based memory is one of the caching layers used as to cache the write data that is then flushed to the backend physical storage. When the processor performs processing, such as in connection with the inline processing 105a, 105b as noted above, data is loaded from the main memory and/or other lower cache levels into its CPU cache.

In at least one embodiment, the data storage system is configured to include one or more pairs of nodes, where each pair of nodes is generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure includes the minimum single pair of nodes and up to a specified maximum number of PDs. In some embodiments, a single base enclosure can be scaled up to have additional BE non-volatile storage using one or more expansion enclosures, where each expansion enclosure includes a number of additional PDs. Further, in some embodiments, multiple base enclosures are grouped together in a load-balancing cluster to provide up to the maximum number of node pairs. Consistent with other discussion herein, each node includes one or more processors and memory. In at least one embodiment, each node includes two multi-core processors with each processor of the node having a core count of between 8 and 28 cores. In at least one embodiment, the PDs are all non-volatile SSDs, such as flash-based storage devices and storage class memory (SCM) devices. It should be noted that the two nodes configured as a pair are also sometimes be referred to as peer nodes. For example, the node A 102a is the peer node of the node B 102b, and the node B 102b is the peer node of the node A 102a.

In at least one embodiment, the data storage system is configured to provide both block and file storage services with a system software stack that includes an operating system running directly on the processors of the nodes of the system.

In at least one embodiment, the data storage system is configured to provide block-only storage services (e.g., no file storage services). A hypervisor can be installed on each of the nodes to provide a virtualized environment of virtual machines (VMs). In at least one embodiment, the system software stack executes in the virtualized environment deployed on the hypervisor. In at least one embodiment, the system software stack (sometimes referred to as the software stack or stack) includes an operating system running in the context of a VM of the virtualized environment. Additional software components can be included in the system software stack and can also execute in the context of a VM of the virtualized environment.

In at least one embodiment, each pair of nodes is configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not be shared with other pairs of nodes. A host can access data stored on a BE PD through the node pair associated with, or attached to, the PD.

In at least one embodiment, each pair of nodes provides a dual node architecture where both nodes of the pair are generally identical in terms of hardware and software for redundancy and high availability. Consistent with other discussion herein, each node of a pair performs processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair includes its own resources such as its own local (i.e., used only by the node) resources such as local processor(s), local memory, and the like.

In at least one embodiment, a data storage system can include one or more storage appliances where each such appliance is a dual node appliance such as described in connection with FIG. 2. In such an embodiment, each appliance can be a dual node appliance including two processing nodes 102a-b which communicate with each other over an internal network connection or interconnect 120 between the nodes 102a, 102b.

In at least one embodiment, each of the nodes 102a-b can be configured with one or more internal disk drives used only by that particular node. The internal disk drives of the nodes can be, for example, non-volatile solid state drives. For example, the node 102a can be configured with one or more internal disk drives used only by the node 102a. An internal disk drive of each of the nodes 102a-b can be used as the primary or main boot device for the node. For example, a first internal disk drive of the node 102a can be used as the primary or main boot device of the node 102a, and a second internal disk drive of the node 102b can be used as the primary or main boot device of the node 102b. Each of the two nodes 102a-b can boot up and operate independently of the other node. In this case, the dual node architecture provides high availability for the single appliance including the nodes 102a-b in that, for example, if one of the nodes 102a-b is offline, down or generally unable to service requests, such as I/O operations, the other one of the nodes 102a-b which remains healthy and operable can still service and handle requests, such as I/O requests for LUNs having storage configured on BE PDs accessible only to the single appliance. Thus, with a dual node appliance, the appliance provides high availability in that the appliance can continue to service requests and provide access to data stored on its BE PDs in the event of a single node failure.

Each of the internal disk drives of the nodes 102a-b used as the primary or main boot device for the node includes, for example, a boot partition, operating system, and other code and/or data used by the node. In particular, the boot partition of the internal disk drive of a node, where the internal disk drive functions as the primary or main boot device for the node, can be used to boot the node. Sometimes, the content stored on the internal disk drive of a node can become corrupted. For example, the boot partition of the internal disk drive of the node can become corrupted whereby the node can no longer boot from its internal disk drive. In this case, it is necessary to perform recovery processing such as to replace the internal disk drive of the node or otherwise to restore the internal disk drive of the node to an operable state. In either case with internal disk drive replacement or restoration of the content of the existing corrupted internal disk drive, recovery processing can be performed using the techniques of the present disclosure to ensure that the restored or replaced internal disk drive of the node includes uncorrupted, usable forms of the boot partition, operating system, and possibly other data and/or code which can vary with embodiment.

Described in the following paragraphs are techniques that can be used to perform recovery processing for a node having a newly installed internal disk drive or a corrupted internal disk drive, where such an internal disk drive can be used as the boot device for the node. Thus although the following paragraphs illustrate the techniques of the present disclosure in an embodiment of a dual node appliance or data storage system, where each node includes an internal disk drive used as the node's local boot device, more generally, the techniques of the present disclosure can be used in connection with recovery processing for a node having a local drive or other form of internal and/or local non-volatile storage used as the boot device for the node, where the boot device include, for example, a boot partition, an operating system, configuration data or information, and other code and/or data which can vary with embodiment. Furthermore the techniques of the present disclosure are not restricted for use in a dual node appliance or system and can generally be used in any suitable multi-node appliance or system.

In at least one embodiment, the techniques of the present disclosure provide for restoring the content of the corrupted internal disk drive of a first node of a dual node data storage system using a second peer node of the dual node data storage system. In at least one other embodiment, the techniques of the present disclosure provide for imaging or installing the operating system and other content on a newly installed internal disk drive of the first node of a dual node data storage system using the second peer node of the dual node data storage system. In this latter embodiment, the newly installed internal disk drive can replace the corrupted, degraded or otherwise non-bootable existing internal disk drive of the first node. In accordance with the techniques of the present disclosure, the boot partition, operating system, and other content can be installed on the new internal disk drive of the first node using the second peer node.

In such embodiments in accordance with the techniques of the present disclosure, the degraded first node with the unbootable internal disk drive can be booted using the healthy and functional second peer node. In particular, the second peer node can include a PXE server that is used to perform a network boot of the unhealthy or degraded first node over an internal network connection between the first and second nodes of the system. Additionally, the boot partition, operating system, and other content currently stored on the second node can be used to reimage and restore the new or corrupted internal disk drive of the first node. Also any necessary system state information, configuration information, and/or other content can be restored from the second node to the new or corrupted internal disk drive of the first node. The internal network connection between the first and second nodes can be used for communications between the nodes and transferring information between the nodes when performing the techniques of the present disclosure. The internal network connection can be internal with respect to the data storage system or appliance including the nodes. In at least one embodiment, the internal network connection can be an internode network connection used only for data storage system internal internode communications and internode data transmissions such as when performing the techniques of the present disclosure.

With reference to FIG. 2, the internal network interconnect 120 between the nodes 102a, 102b can be used for internode communication and internode data transmissions between the nodes 102a-b when performing the techniques of the present disclosure.

In at least one embodiment, the techniques of the present disclosure provide for performing recovery processing for a failed node by leveraging the capabilities of a healthy peer node which functions as a PXE server for the failed node to perform a network boot and network installation for the failed node.

In at least one embodiment, the recovery processing of the present disclosure can be performed automatically in response to error detection of a failed node where the failure can be detected by a hardware and/or software component in the system, or in response to a user request such as a user request made using a management application.

In at least one embodiment, the recovery processing of the present disclosure can be triggered in response to an occurrence of defined trigger condition. An embodiment can generally define one or more trigger conditions where the recovery processing occurs in response to an occurrence of any one of the defined trigger conditions. In at least one embodiment, the one or more defined trigger conditions which can trigger recovery processing techniques described herein can include one or more of the following: when an internal disk drive used as the boot device of a node becomes corrupted, fails or otherwise cannot be accessed; when a node fails to boot successfully using its internal disk drive which is used as the node's boot device; when an internal disk drive, or more generally a non-volatile storage device, used as the boot device for a node generally requires reimaging; when a node failure is detected; when a node is unresponsive such as, for example, to either internal requests from its peer node or external requests from clients; when a node has no external network connectivity; when a board management component (BMC), which is included on the same CPU board as the processing node, is active and responsive but the node is not responsive such as to queries from the BMC; when a node is replaced; when the internal disk drive or other device used as the boot device for a node is replaced; and when an on-demand or manual request is made to perform recovery processing of a node using the techniques of the present disclosure where the request can be, for example, a user request to perform the recovery processing. In at least one embodiment, when any one or more of the foregoing defined trigger conditions occurs with respect to a first node of a multi-node system, the techniques described herein can be used to perform recovery processing for the first node using another peer node of the system, where the peer node can be used as an installation server, such as a PXE server, to boot the first node and install the operating system and any other desired code and/or data on the first node.

In at least one embodiment, each node can be included on a separate CPU board with one or more other components. For example, a node can include one or more CPUs or processors on a CPU board with one or more other components, such as a BMC. The BMC can perform processing such as report on the status of the CPUs and other components on the same board as the BMC. In at least one embodiment, the BMC can poll the CPUs of the node to determine a current status of the CPUs. The BMC can have a separate network or communication connection to components of the board which is used by the BMC to perform its management processing. The BMC can also be powered using a power supply separate from another main power supply normally used by components of the board. The BMC is described in more detail in the following paragraphs.

In at least one embodiment in accordance with the techniques herein with a dual node system, using the healthy peer node as a PXE server for recovery processing for another degraded node of the system provides a secure solution. For example, the peer node is used to perform a secure network booting of the degraded or unhealthy node using software of the healthy peer node, where such software is from a known, secure and controlled source. Additionally, in such an embodiment, the software of the healthy peer node is downloaded over the internal internode network connection between the nodes and used to boot the degraded node, where such software can be included on an internal disk drive of the healthy peer node.

In accordance with the techniques of the present disclosure where the healthy peer node serves as an installation server, additional code and/or data, such as, for example, configuration files, backups, node and/or system state information, and the like, can be copied from the peer node to the degraded node at installation time. The foregoing can simplify recovery processing as opposed to, for example, obtaining such additional code and/or data from a different source or location other than from the installation server.

The techniques of the present disclosure provide a safe and reliable way to automatically perform recovery processing for a failed or degraded node using its healthy peer node.

The foregoing and other aspects of the techniques of the present disclosure are described in more detail in the following paragraphs.

Figure 3:
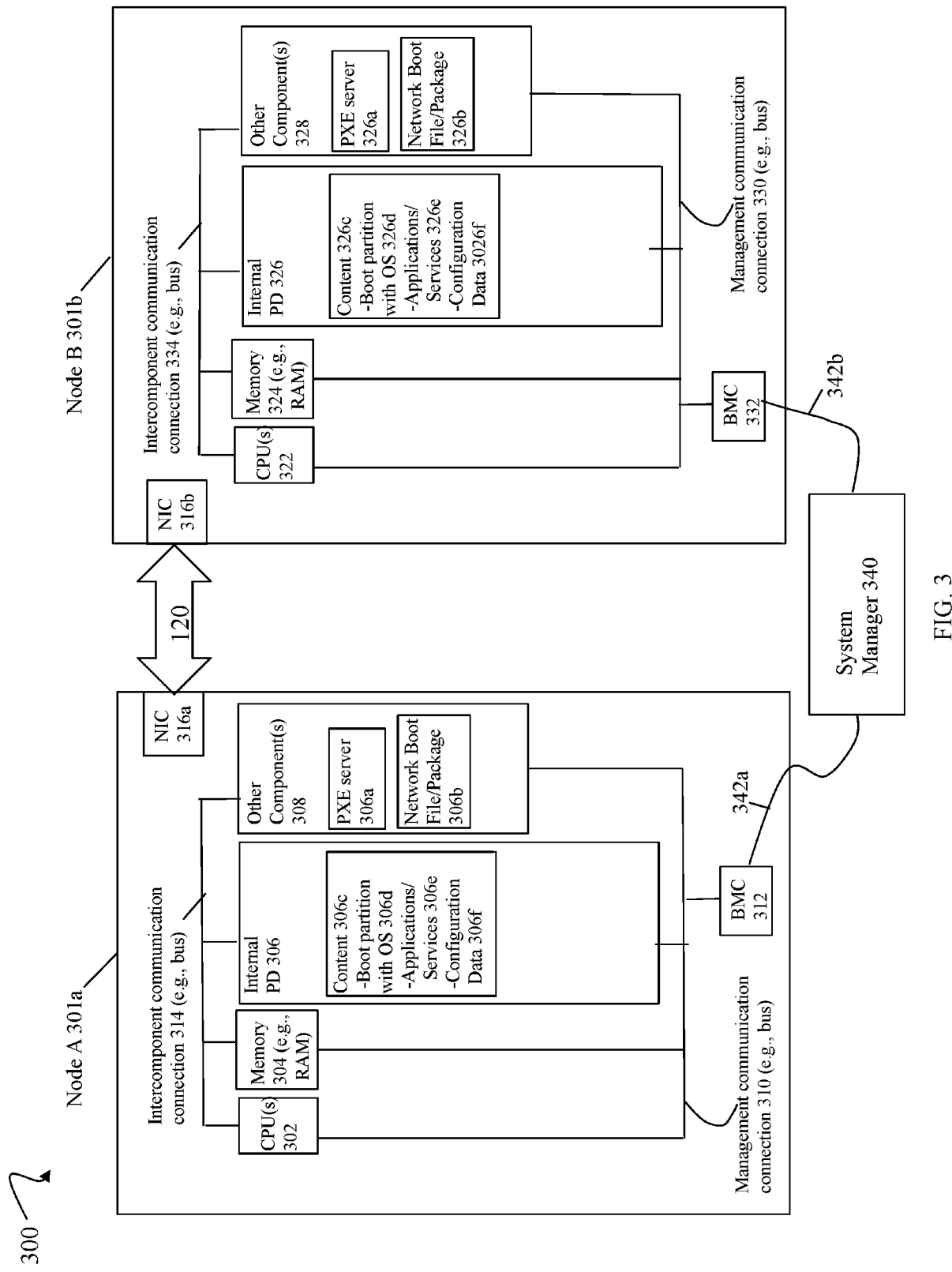

Referring to FIG. 3, shown is an example 300 illustrating components that can be included in a dual node appliance or data storage system in at least one embodiment in accordance with the techniques of the present disclosure.

The example 300 includes the two nodes A 301a and B 301b such as discussed above in connection with FIG. 2. The appliance or system can also include other components than as illustrated in FIG. 3 for simplicity of illustrations.

The node 301a can include one or more CPUs or processors 302, a memory 304 (e.g., such as RAM or another form of volatile memory used locally only by the node 301a), an internal PD 306 (e.g., such as a non-volatile solid state drive), a BMC 312, a NIC(network interface card) 316a, and one or more other components 308. The element 314 denotes a intercomponent communication connection, such as a bus or other suitable communication connection, which the different components of the node 301a use to communicate with one another. The element 310 denote a management communication connection, such as a bus or other suitable communication connection, which is used only for communications between the BMC 312 and components of the node A 301a. In at least one embodiment, the components of the node 301a can be included on the same physical component board or card.

The internal PD 306 of the node A 301a can include the content 306c comprising a boot partition with an operating system (OS) 306d, images or code and data for one or more applications or services 306e, and configuration information or data 306f. It should be noted that the configuration information or data 306f can also be stored in another location, such as on another form of non-volatile storage located within, or otherwise accessible to, the node A 301a.

The one or more other components 308 of the node A 301a can include a PXE server 306a and a network boot file or package 306b, where each of 306a and 306b can be generally stored on any suitable non-volatile storage which is located within, or otherwise accessible to, the node A 301a.

The BMC 312 of the node A 301a is a component that includes its own processor (and possibly processor local memory, FPGAs, and other components that may vary with embodiment). The BMC 312 can generally perform processing regarding management, control and status of other components on the same board, such as those included in the same node 301a, as the BMC 312. For example, the BMC 312 can periodically check on the status of other components, receive signals from other components for use in connection with management and other processing performed by the BMC, enable/disable other components, and the like.

In at least one embodiment, the BMC 312 of the node A 301a can have separate network management (MGT) connections 310 to other components on the board and can also have a separate power supply (not illustrated) from other components on the board. Such MGT connections 310 can be used by the BMC component to check on the status of other components and also perform any necessary management of such components. In at least one embodiment, the MGT connections 310 between the BMC and other components of the board can be dedicated connections used only for communications between the BMC 312 and the other components of the node 301a for BMC processing. For example, the BMC can communicate over the MGT connection 310 to a component, such as a CPU or processor 302 of the node 301a, in order to check on the status of the component. For example, the BMC 312 can periodically poll or query the node's CPU 302 over the MGT connection 310. In response, the CPU 302 can reply over the MGT connection 310 to the BMC 312 regarding the CPU 302's current status. If the BMC 312 does not receive a response to its query from the CPU 302 over the MGT connection 310, the BMC component 312 can determine that the CPU 302 is in a degraded or unhealthy state thereby requiring performing recovery processing using the techniques of the present disclosure. As an alternative, the BMC 312 can receive a response from the CPU 302 where the response itself provides a status which indicates the node is in a healthy state, or otherwise is in a degraded or unhealthy state which requires performing recovery processing using the techniques of the present disclosure.

The system manager component 340 includes system software which can communicate over the connection 342a with the BMC 312 of the node A 301a regarding the status of the components on the board of the node 301a as well as the status of the BMC 312 itself. For example, the system manager 340 can communicate with the BMC 312, where the BMC 312 can report regarding the current status of a CPU 302 or other components of the node 301a, and can accordingly raise any necessary alert, system event or notification.

The node 301b can include components similar to those described in connection with the node 301a. The node 301b can include one or more CPUs or processors 322, a memory 324 (e.g., such as RAM or another form of volatile memory used locally only by the node 301a), an internal PD 326 (e.g., such as a non-volatile solid state drive), a BMC 332, a NIC 316b, and one or more other components 308. The element 334 denotes a intercomponent communication connection, such as a bus or other suitable communication connection, which the different components of the node 301b use to communicate with one another. The element 330 denote a management communication connection, such as a bus or other suitable communication connection, which is used only for communications between the BMC 332 and components of the node B 301b. In at least one embodiment, the components of the node 301b can be included on the same physical component board or card.

The system manager component 340 includes system software which can communicate over the connection 342b with the BMC 332 of the node B 301b regarding the status of the components on the board of the node 301b as well as the status of the BMC 332 itself. For example, the system manager 340 can communicate with the BMC 332, where the BMC 332 can report regarding the current status of a CPU 322 or other components of the node 301b, and can accordingly raise any necessary alert, system event or notification.

The internal PD 326 of the node B 301b can include content 326c comprising a boot partition with an operating system (OS) 326d, images or code and data for one or more applications or services 326e, and configuration information or data 326f. It should be noted that the configuration information or data 326f can also be stored in another location, such as on another form of non-volatile storage located within, or otherwise accessible to, the node B 301b.

The one or more other components 328 can include a PXE server 326a and a network boot file or package 326b, where each of 326a and 326b can be generally stored on any suitable non-volatile storage which is located within, or otherwise accessible to, the node B 301b.

The NICs 316a-b can be PXE-enabled NICs used in connection with performing network booting from a peer node over the network connection 120. In at least one embodiment, each of the NICs 316a-b can include client-side code stored in firmware of the NIC, where the client-side code is used to communicate with a PXE server on a peer node over the network connection 120. For example, the NIC 316b of the node B 301b can include firmware with client-side code used to communicate over the connection 120 with a loaded and executing instance of the PXE server 306a of the peer node 301a. The PXE server 306 can be stored on non-volatile storage and loaded into the memory 304 for execution by the CPU 302 and communication with the NIC 316b.

As will be described in more detail in the following paragraphs, the PXE workflow can include booting a PXE-enabled NIC, such as NIC 316b, resulting in execution of the code in the NIC's firmware. The NIC 316b contains firmware with a network stack and, generally code, which connects to the internal network or local area network (LAN) including the connection 120, and requests and receives a file (e.g., such as a network boot file or package) from the PXE server 306a of the node 301a to boot. In this example, the node 301b boots the file downloaded from the node 301a over the network connection 120, where the booting can further result in an automated installation of an operating system, applications or services, and the like.

The PXE servers 306a, 326a respectively of the nodes 301a-b can include multiple software servers. In at least one embodiment, each of the PXE servers 306a, 326a can include a network configuration server, such as a DHCP (dynamic host configuration protocol) server, and a file server, such as a TFTP (trivial file transfer protocol) server. In such an embodiment, each of the NICs 316a-b includes code in its firmware to perform the client-side processing and communication with the DHCP server and the TFTP server of a PXE server.

Generally, the DHCP server as can be included in a PXE service instance provides a network configuration to clients. A DHCP server dynamically assigns an IP address and other network configuration parameters to each device on a network so they can communicate with other devices on the network. DHCP can be characterized a network management protocol used to automate the process of configuring devices on IP networks, thus allowing them to use network services and any communication protocol based on UDP or TCP. In particular, the DHCP server provides an IP network configuration to a client. The code of a DHCP client (e.g., as stored in the firmware of the NICs 316a-b) from a particular node runs on a CPU of the node, where the node joins the internal network or LAN of the system included in the nodes 301a-b, and where the internal network or LAN includes the connection 120 and the nodes 301a-b. When a DHCP client communicates with a DHCP server for a network configuration, the DHCP server generally provides the DHCP client with configuration information which can include, for example, an IP address for the client/node upon which the client executes, and the network location such as an IP address of the TFPT server from which to download the network boot file or package.

The TFTP server as can be included in a PXE server instance communicates with a TFTP client. The code of a TFTP client (e.g., as stored in the firmware of the NICs 316a-b) from a particular node runs on a CPU of the node.

TFTP is a UDP-based protocol for sending and receiving a file.

In at least one embodiment, each of the PXE servers 306a, 316a can also include an HTTP (hypertext transfer protocol) server, or more generally a network protocol server which is used to provide requested content to HTTP clients. The code of an HTTP client (e.g., as stored in the firmware of the NICs 316a-b) from a particular node runs on a CPU of the node. An HTTP server includes software that understands URLs or internet addresses and the HTTP protocol to view webpages. An HTTP server delivers requested content to an client or end user's device. HTTP is generally a network protocol used for content and information exchange. Thus, the HTTP server is a server that implements a request/response model over a network using the HTTP protocol. The HTTP server processes incoming network requests from clients over the HTTP protocol and returns requested content over the internet. In at least one embodiment in accordance with the techniques herein, the HTTP server included in the PXE server of one node can be used to provide content to an HTTP client of another peer node, where the content can be used to reimage or restore an internal PD used as a boot device of the peer node. This is described in more detail in the following paragraphs.

As a variation in at least one embodiment, rather than include the HTTP server as a component within the PXE server of a node, the HTTP server can itself be a separate component not included in the PXE server of the node. It should be noted that the HTTP server and its use are described herein in connection with one embodiment of the techniques of the present disclosure. More generally, another embodiment can omit the HTTP server and its use and can alternatively use another server or service in connection with processing described herein such as in connection with FIG. 4B. Additionally as also noted below in connection with the processing described in connection with FIGS. 4A and 4B, an embodiment can alternatively omit using the HTTP server to download additional content (e.g., in the step 426 of FIG. 4B) and can rather restore and reimage an internal PD of an unhealthy or failed node directly from the content of network boot file or package downloaded directly from the TFTP server (e.g., as downloaded in the step 422 of FIG. 4B).

In at least one embodiment, the network boot file or packages 306b, 326b can include a temporary OS, a temporary file system and a boot configuration file.

In at least one embodiment illustrated in FIG. 3 for a dual node appliance or system, the local LAN can include only the connection 120 and the nodes 301a-b. The local internal LAN within the appliance is separate network from any external network, such as an external SAN which can include the appliance. In FIG. 3, each endpoint of the internal internode network connection 120 at one of the nodes 310a-b has an associated IP address on the local internal LAN where the LAN only includes the two nodes of the appliance. More generally, the appliance can include two or more nodes which are internal to the appliance and the LAN can include the two or more nodes and the connection 120 can be between the two or more nodes where each such node has an associated IP address in the local internal LAN of the appliance. In at least one embodiment, the local internal LAN of the appliance can only include the two or more nodes of the appliance which communicate over the internal internode network connection 120. In at least one embodiment, the element 120 can generally denote one or more such connections used solely for internode communications. In an embodiment including multiple such connections of the internal LAN, the techniques of the present disclosure can generally be performed using any one or more of the internal internode network connections represented by the element 120. For example, an embodiment may have multiple internal internode network connections 120 where one of the connections 120 can be used as a primary connection and a second one of the connections 120 can be used as a backup or replacement in the event the primary connection fails or otherwise is not operable. As another example, an embodiment can use multiple connections 120 as primary internode connections such as when performing recovery processing of the present disclosure.

In at least one embodiment, all PXE server components, such as the DHCP server and the TFTP server, of a particular PXE server instance all have the same IP address associated with the particular node upon which particular PXE server instance executes.

In at least one embodiment, a PXE server of a node can be started in response to a trigger event occurrence. For example, in at least one embodiment, the PXE server and recovery processing described herein can be started in response to an on-demand request such as by a user making the request using a management application.

In at least one embodiment, the system manager component 340 can automatically start the PXE server of a node and recovery processing described herein in response to an occurrence of a defined trigger event such as one of those described elsewhere herein. For example, the system manager component 340 can determine that a node such as node B 301b, or a CPU 322 of the node B 301b, is non-responsive and/or cannot boot from its internal PD 326 including the boot partition 326b. In response, the system manager 340 can automatically load and commence execution of the PXE server 306a on the node A 301a.

Figure 4B:
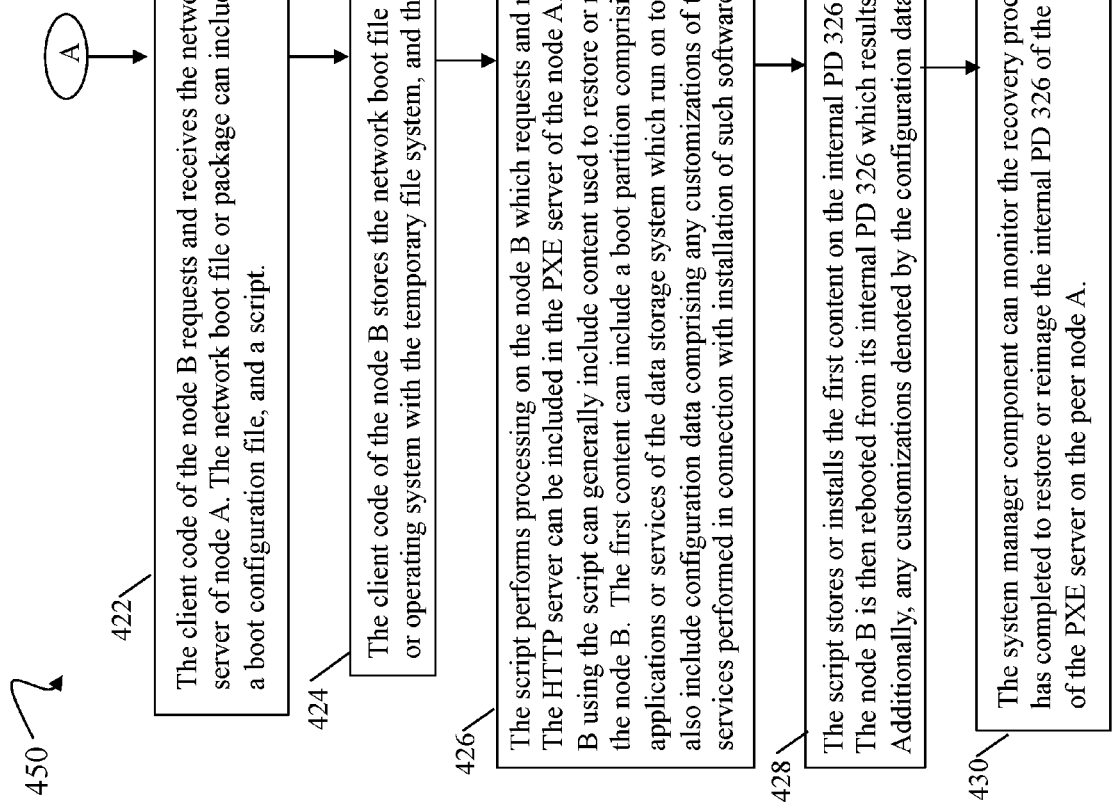

What will now be described in connection with the flowcharts 400, 450 of FIGS. 4A and 4B is an example illustrating use of the techniques of the present disclosure with reference to the components of FIG. 3. In the example below, the node B 301b is the unhealthy node having the internal PD 326 for which recovery processing is performed using the PXE server 306a of the node A 301a. However, more generally, the techniques of the present disclosure can also be used in connection with scenarios where the node A 301a is the unhealthy node having the internal PD 306 for which recovery processing is performed using the PXE server 326a of the node B 301b.

At a step 402, a trigger condition occurs which indicates that performing recovery processing for a first node, such as node B, is necessary. The recovery processing can therefore be performed responsive to the occurrence of the trigger condition. Examples of different trigger conditions that can occur and result in performing recovery processing of the present disclosure are described elsewhere herein. For example, consistent with other discussion herein, the trigger condition can denote an error condition or can be an on-demand request to perform recovery processing for the first storage device of the first node. The first storage device of the node B can be the internal PD 326 of node B 301b, where the internal PD 326 is used as a boot device to boot the node B. The trigger condition can be, for example, an error condition related to the boot device, the internal PD 326 of the node B. The error condition, or other trigger condition as described elsewhere herein, can be automatically detected by the system manager component 340. In response to detecting the error condition, or more generally an occurrence of a defined trigger condition, the system management component 340 can initiate and control performing recovery processing for the internal PD 326 of the node B. The recover processing can include performing processing to re-image or restore the internal PD 326 of node B used for booting the node B 301*b*. From the step 402, control proceeds to the step 404.

At the step 404, in response to the trigger condition occurrence detected in the step 402, the system manager component 340 loads and starts execution of the PXE server 306*a* on the peer node, node A in this example. In at least one embodiment as noted above, the PXE server 306*a* can include a network configuration server such as a DHCP server, a file server such as a TFTP server, and a network protocol server, such as an HTTP server. Thus, in this particular embodiment, the PXE server 306*a* is started on demand by the system manager 340. As a variation, the PXE servers 306*a* and 326*b*, respectively, of the nodes 301*a-b* can be loaded and executing prior to the trigger condition occurrence.

In at least one embodiment, the PXE server 306*a* can execute in an execution domain, and wherein the system manager 340 starts execution of the execution domain including the PXE server on-demand in response to the notification regarding the occurrence of the trigger condition in the step 402. In at least one embodiment, the execution domain for the PXE server can be a virtual machine. In this case, the PXE server executes as an application in the context of a virtual machine with its own guest operating system. Thus, each virtual machine includes its own operating system. As a variation, in at least one embodiment, the execution domain for the PXE server can be a container or containerized application which shares a single operating system with one or more other containerized applications, where the single operating system is the host operating system such as of the data storage system. Once the system manager 340 determines that the PXE server 306*a* of the node A 301*a* is executing, control proceeds from the step 404 to the step 406.

At the step 406, the system manager 340 communicates with the BMC 332 of the first node, node B 301*b* in this example, and instructs the BMC 332 to boot the node B from the network. Consistent with other discussion herein, the network can be the internal LAN of the dual node appliance. The internal LAN can including the nodes 301*a-b* and internode network connection 120 between the two nodes 301*a-b*. The BMC 332 of node B 301*b* can indirectly trigger execution of the firmware of the NIC 316*b* of node B, where the NIC firmware includes the client-side code for performing a network boot over the internode network connection 120. For example, the BMC 332 of node B can communicate with the BIOS of node B and instruct the BIOS of node B to perform a network boot over the internode network connection 120 using the NIC firmware of the NIC 316*b*. From the step 406, control proceeds to the step 408.

At the step 408, the client code (of the NIC firmware of 316*b* of the node B 301*b*) boots and broadcasts a first request or packet over the internal LAN connection 120 indicating that node B needs a network configuration from the DHCP server of the PXE server 306*a* of the peer node A 301*a*. From the step 408, control proceeds to the step 410.

At the step 410, the DHCP server included in the PXE server 306*a* of node A 301*a* responds to the first request by sending a first response to the node B. The first response can include a network configuration as specified by the DHCP protocol. The network configuration can include the new IP address for the client node A, and can also identify the network location of the network boot file or package 306*b* to be downloaded and executed by the client code (e.g., from the NIC 316*b*) of the node B. The network location of the network boot file or package 306*b* can be the IP address of the TFTP server of the PXE server 306*a* on the peer node A 301*a*. From the step 410, control proceeds to the step 422.

At the step 422, the client code of the node B (e.g., where the client code is from the firmware of the NIC 316*b*) requests and receives the network boot file or package 306*b* from the TFTP server of the PXE server 306*a* of node A 301*a*. The network boot file or package 306*b* can include a temporary kernel or operating system, a temporary file system, a boot configuration file, and a script. The boot configuration file can include, for example, parameters used in connection with booting the temporary kernel or operating system. From the step 422, control proceeds to the step 424.

At the step 424, the client code of the node B (e.g., where the client code is from the firmware of the NIC 316*b*) stores the network boot file or package in the RAM of the node B. As discussed above, in at least one embodiment, the network boot file or package can include a temporary kernel or operating system, a temporary file system and a script. In the step 424, the client code then performs processing using the network boot file or package stored in the memory 324 of node B including booting the temporary kernel or operating system with the temporary file system, and then executing the script. In at least one embodiment, the temporary kernel or operating system can be booted directly from RAM. Additionally, other items of the network boot file or package can also be more generally utilized directly from RAM. It should be noted that an embodiment can use an alternate suitable technique or a variation from that described above in the step 424. For example, in at least one embodiment, one or more elements form the network boot file or package can be alternatively stored from the RAM to non-volatile storage, such as on an internal PD of the node B, and then booted from the non-volatile storage. From the step 424, control proceeds to the step 426.

At the step 426, the script performs processing on the node B which requests and receives first content from the HTTP server of the node A. As noted above, the HTTP server can be included in the PXE server of the node A. The first content downloaded from the node A to the node B using the script can generally include the content used to restore or reimage the internal PD 326 of the node B used as the boot device for the node B. The first content can include the content 306*c* of the node A 301*a* comprising a boot partition which includes an operating system 306*d*. The first content can include code for applications or services 306*e* of the data storage system which run on top of the installed operating system. The first content can also include configuration data 306*f* comprising any customizations of the operating system and any customizations of the applications or services performed in connection with installation of such software on the nodes A and B.

As noted above, use of an HTTP server or service is one way in which the techniques of the present disclosure can be implemented. More generally, any suitable service or application can be used in place of the HTTP server. As yet a further variation in at least one embodiment, the network boot file or package can include the full operating system or kernel rather than a temporary one. In this latter case, the network boot file or package can include other information, code and/or data that is not characterized as temporary whereby the restored content placed on the internal PD 326 of the node B can be restored directly from content of the network boot file or package (e.g., as downloaded and stored in the steps 422 and 424). In this latter case the content of the network boot file or package can be stored on the internal PD 326 of the node B and the script can directly install the operating system, applications and other content directly using the content of the network boot file or package thereby omitting the step 426. In this latter cae, the node can be rebooted as operational using the operating system as included in the downloaded network boot file or package.

From the step 426, control proceeds to the step 428.

At the step 428, the script stores or installs the first content downloaded from the node A in the step 426 on the internal PD 326 of the node B to reimage or restore the internal PD 326 of the node B. The node B is then rebooted from its internal PD 326 which results in running the operating system and applications or services. Additionally, any customizations denoted by the configuration data are applied to the installation of the operating system and applications.

Generally, the content restored to the internal PD 326 can also include other items that vary with embodiment such as, for example, other binary images and executables. The configuration data can include customizations made to the operating system, applications, data path and/or control path software, and other software installed on the node, such as other software of the system software stack. The configuration data can generally include any customizations made in the prior installation of the operating system and software on the nodes 301a-b. Thus the customizations of the prior installation can be recorded in the configuration data, where the configuration data can then be subsequently retrieved and reapplied to the operating system and other software components of the system software stack in connection with restoring the internal PD 326 with the operating system and other software, and booting the operating system from the restored content of the internal PD 326. Thus at least some of the configuration data can be applied, for example, by updating files of the operating system and other components of the system software stack with user-specified customization, by enabling and disabling particular software components of the system software stack based on user-specified customizations, and the like. Applying the configuration data to the operating system can include updating portions of the operating system with some of the configuration data. The configuration data can also be applied as the system software stack is brought up (e.g., built, loaded and executed) by identifying particular software components, services or layers to include in the system software stack or otherwise identifying particular software components, services or layers of the system software stack that are enabled or disabled. From the step 428, control proceeds to the step 430.

At the step 430, the system manager component can monitor the recovery processing performed for the node B. Once recovery processing has completed to restore or reimage the internal PD 326 of the node B and also successfully boot node B using the restored or reimaged internal PD 326, the system manager component can terminate the execution of the PXE server 306a on the peer node A.

In at least one embodiment, the system manager 340 can also perform verification processing prior to commencing with recovery processing beginning with the step 404 of FIG. 4A. For example, the system manager 340 can verify that one or more preconditions required to perform recovery processing are met. For example, the system manager 340 can ensure that it can communicate with the BMCs 312, 332, respectively, of the nodes 301a-b. The system manager 340 can also ensure that the peer node, such as node A, includes a PXE server with the required components needed to perform recovery processing. For example, the system manager 340 can ensure that the PXE server 306a includes a DHCP server, a TFTP server, and an HTTP server. If such preconditions are met, then recovery processing can proceed. Otherwise, the system manager 340 will not perform recovery processing using the techniques of the present disclosure.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
receiving a notification regarding an occurrence of a trigger condition which indicates to perform recovery processing for a first storage device of a first node, wherein the first storage device is a non-volatile storage device of the first node and is used as a boot device for the first node, wherein a data storage system includes the first node and a second node which is configured to communicate with the first node over an internal network connection within the data storage system; and
responsive to receiving the notification of the trigger condition, performing recovery processing for the first storage device of the first node, said recovery processing including:
performing a network boot of the first node over the internal network connection using a preboot execution (PXE) server of the second node;
executing first code on the first node to perform first processing including:
downloading first content from a second storage device of the second node to the first storage device of the first node, wherein the first content includes a bootable partition comprising an operating system, one or more applications or services to run on the operating system, and storage configuration data including customizations performed to any of: the operating system, and the one or more applications or services; and
reimaging the first storage device of the first node using the first content included on the second storage device of the second node; and
using the bootable partition of the first storage device of the first node, booting the first node to load and run the operating system and the one or more applications or services on the first node with any customizations applied as denoted by the storage configuration data.

2. The computer-implemented method of claim 1, wherein the internal network connection is an internode network connection between the first node and the second node.

3. The computer-implemented method of claim 2, wherein an internal local area network (LAN) within the data storage system includes the first node and the second node, wherein the first node has a first IP (internet protocol) address on the internal LAN and the second node has a second IP address on the internal LAN, wherein the first node uses the first IP address and the second node uses the second IP address to communicate with one another over the internal network connection when performing said recovery processing.

4. The computer-implemented method of claim 3, wherein the PXE server of the second node includes a network configuration server, and a file server.

5. The computer-implemented method of claim 4, wherein the recovery processing further comprises:
sending a first request from the first node over the internal LAN, wherein said sending broadcasts the first request over the internal LAN and indicates that the first node needs a network configuration;
receiving, by a network configuration server of the second node, the first request;
assigning, by the network configuration server of the second node, the first IP address to the first node; and
sending, to the first node, a first response to the first request from the network configuration server of the second node, wherein the first response includes information identifying the first IP address as assigned to the first node and identifying the second IP address as the network address of the file server on the internal LAN.

6. The computer-implemented method of claim 5, wherein the recovery processing further comprises:
sending a second request from the first node to the file server having the second IP address of the second node, wherein the second request requests a network boot file or package including a temporary kernel or operating system, a temporary file system, a script, and a boot configuration data file of parameters used in connection with booting the temporary kernel or operating system, wherein the script includes the first code that performs the first processing; and
in response to receiving the second request, sending the network boot file or package from the file server of the second node to the first node.

7. The computer-implemented method of claim 6, wherein said recovery processing further comprises:
storing the network boot file or package in a volatile memory of the first node; and
booting the first node using the temporary kernel or operating system of the network boot file or package stored in the volatile memory of the first node, wherein after said booting the temporary file system is executing on the first node.

8. The computer-implemented method of claim 7, wherein the second node includes a network protocol server.

9. The computer-implemented method of claim 8, wherein said downloading the first content includes issuing one or more requests from the first node to the network protocol server of the second node.

10. The computer-implemented method of claim 9, wherein the network protocol server is included in the PXE server of the second node.

11. The computer-implemented method of claim 10, wherein the first node includes a first board management component (BMC), the second node includes a second BMC, and the data storage system includes a system manager component that communicates with the first BMC and the second BMC to manage components of the first node and the second node.

12. The computer-implemented method of claim 11, wherein the system manager receives the notification regarding the occurrence of the trigger condition, and wherein the system manager communicates with the first BMC of the first node to initiate performing said recovery processing for the first storage device of the first node.

13. The computer-implemented method of claim 12, wherein the PXE server is included in an execution domain, and wherein the system manager starts execution of the execution domain including the PXE server on-demand in response to receiving the notification regarding the occurrence of the trigger condition.

14. The computer-implemented method of claim 13, wherein the trigger condition is one of a plurality of defined trigger conditions comprising: determining that the first node is unable to boot using the first storage device; and replacing an existing device of the first node with a new device which is the first storage device.

15. The computer-implemented method of claim 14, wherein the plurality of defined trigger conditions further include one or more of: when the first storage device of first node becomes corrupted, fails or otherwise cannot be accessed; when the first storage device requires re-imaging; when the first node fails; when the first node is unresponsive to either internal requests from the second node or external requests from external clients; when the first node has no external network connectivity; when the first BMC is active and responsive but a processor of the first node is not responsive to queries from the first BMC; and when the first node is replaced.

16. The computer-implemented method of claim 5, wherein the first storage device is an internal non-volatile storage device of the first node, the second storage device is an internal non-volatile storage device of the second node, the first node includes a NIC (network interface card) with firmware which includes client software which performs processing including:
said sending the first request from the first node over the internal LAN;
receiving the first response to the first request from the network configuration server of the second node;
said sending the second request from the first node to the file server of the second node; and
receiving the network boot file or package from the file server of the second node.

17. The computer-implemented method of claim 16, wherein said processing performed by the client software of the NIC of the first node further comprises:
said storing the network boot file or package in a volatile memory of the first node; and
said booting the first node using the temporary kernel or operating system of the network boot file or package stored in the volatile memory of the first node.

18. The computer-implemented method of claim 1, wherein the trigger condition is an on-demand request to perform the recovery processing.

19. A system comprising:
one or more processors; and
a memory comprising code stored thereon that, when executed by at least a first of the one or more processors, performs a method comprising:
receiving a notification regarding an occurrence of a trigger condition which indicates to perform recovery processing for a first storage device of a first node, wherein the first storage device is a non-volatile storage device of the first node and is used as a boot device for the first node, wherein a data storage system includes the first node and a second node which is configured to communicate with the first node over an internal network connection within the data storage system; and responsive to receiving the notification of the trigger condition, performing recovery processing for the first storage device of the first node, said recovery processing including:

performing a network boot of the first node over the internal network connection using a preboot execution (PXE) server of the second node;

executing first code on the first node to perform first processing including:

downloading first content from a second storage device of the second node to the first storage device of the first node, wherein the first content includes a bootable partition comprising an operating system, one or more applications or services to run on the operating system, and storage configuration data including customizations performed to any of: the operating system, and the one or more applications or services; and reimaging the first storage device of the first node using the first content included on the second storage device of the second node; and using the bootable partition of the first storage device of the first node, booting the first node to load and run the operating system and the one or more applications or services on the first node with any customizations applied as denoted by the storage configuration data.

20. A non-transitory computer readable medium comprising code stored thereon that, when executed by a processor, performs a method comprising:

receiving a notification regarding an occurrence of a trigger condition which indicates to perform recovery processing for a first storage device of a first node, wherein the first storage device is a non-volatile storage device of the first node and is used as a boot device for the first node, wherein a data storage system includes the first node and a second node which is configured to communicate with the first node over an internal network connection within the data storage system; and responsive to receiving the notification of the trigger condition, performing recovery processing for the first storage device of the first node, said recovery processing including:

performing a network boot of the first node over the internal network connection using a preboot execution (PXE) server of the second node;

executing first code on the first node to perform first processing including:

downloading first content from a second storage device of the second node to the first storage device of the first node, wherein the first content includes a bootable partition comprising an operating system, one or more applications or services to run on the operating system, and storage configuration data including customizations performed to any of: the operating system, and the one or more applications or services; and reimaging the first storage device of the first node using the first content included on the second storage device of the second node; and using the bootable partition of the first storage device of the first node, booting the first node to load and run the operating system and the one or more applications or services on the first node with any customizations applied as denoted by the storage configuration data.

21. A computer-implemented method comprising:

receiving a notification regarding an occurrence of a trigger condition which indicates to perform recovery processing for a first storage device of a first node, wherein the first storage device is a non-volatile storage device of the first node and is used as a boot device for the first node, wherein a data storage system includes the first node and a second node, wherein the second node is configured to communicate with the first node over an internal network connection within the data storage system, wherein the first node and the second node are both computer processor nodes of the data storage system; and responsive to receiving the notification of the trigger condition, performing recovery processing for the first storage device of the first node, said recovery processing including:

performing a network boot of the first node over the internal network connection using a preboot execution (PXE) server executing on a processor of the second node;

reimaging the first storage device of the first node using first content included on a second storage device of the second node, wherein the first content includes a bootable partition comprising an operating system; and using the bootable partition of the first storage device of the first node, booting the first node to load and run the operating system, wherein the first storage device of the first node is a node-local resource which is an internal storage device of the first node and used only by the first node, and wherein the second storage device of the second node is a node-local resource which is an internal storage device of the second node and used only by the second node.

22. A system comprising:

one or more processors; and a memory comprising code stored therein that, when executed, performs a method comprising:

receiving a notification regarding an occurrence of a trigger condition which indicates to perform recovery processing for a first storage device of a first node, wherein the first storage device is a non-volatile storage device of the first node and is used as a boot device for the first node, wherein a data storage system includes the first node and a second node, wherein the second node is configured to communicate with the first node over an internal network connection within the data storage system, wherein the first node and the second node are both computer processor nodes of the data storage system; and responsive to receiving the notification of the trigger condition, performing recovery processing for the first storage device of the first node, said recovery processing including:

performing a network boot of the first node over the internal network connection using a preboot execution (PXE) server executing on a processor of the second node;

reimaging the first storage device of the first node using first content included on a second storage device of the second node, wherein the first content includes a bootable partition comprising an operating system; and using the bootable partition of the first storage device of the first node, booting the first node to load and run the operating system, wherein the first storage device of the first node is a node-local resource which is an internal storage device of the first node and used only by the first node, and wherein the second storage device of the second node is a node-local resource which is an internal storage device of the second node and used only by the second node.

23. A non-transitory computer readable memory comprising code stored thereon that, when executed, performs a method comprising:

receiving a notification regarding an occurrence of a trigger condition which indicates to perform recovery processing for a first storage device of a first node, wherein the first storage device is a non-volatile storage device of the first node and is used as a boot device for the first node, wherein a data storage system includes the first node and a second node, wherein the second node is configured to communicate with the first node over an internal network connection within the data storage system, wherein the first node and the second node are both computer processor nodes of the data storage system; and responsive to receiving the notification of the trigger condition, performing recovery processing for the first storage device of the first node, said recovery processing including:

performing a network boot of the first node over the internal network connection using a preboot execution (PXE) server executing on a processor of the second node;

reimaging the first storage device of the first node using first content included on a second storage device of the second node, wherein the first content includes a bootable partition comprising an operating system; and using the bootable partition of the first storage device of the first node, booting the first node to load and run the operating system, wherein the first storage device of the first node is a node-local resource which is an internal storage device of the first node and used only by the first node, and wherein the second storage device of the second node is a node-local resource which is an internal storage device of the second node and used only by the second node.

* * * * *